(12) United States Patent
Son et al.

(10) Patent No.: US 10,556,496 B2
(45) Date of Patent: Feb. 11, 2020

(54) POWER TRAIN

(71) Applicant: Hyundai Motor Company, Seoul (KR)

(72) Inventors: You Sang Son, Suwon-si (KR); Ingee Suh, Yongin-si (KR); Jae Bum Park, Suwon-si (KR); Kyoung Pyo Ha, Seongnam-si (KR); Jeong Soo Eo, Hwaseong-si (KR); Back Sik Kim, Osan-si (KR); Yeonho Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 491 days.

(21) Appl. No.: 15/373,757

(22) Filed: Dec. 9, 2016

(65) Prior Publication Data

US 2018/0111468 A1  Apr. 26, 2018

(30) Foreign Application Priority Data

Oct. 24, 2016  (KR) ......................... 10-2016-0138359

(51) Int. Cl.
| | |
|---|---|
| *B60K 6/485* | (2007.10) |
| *B60K 6/26* | (2007.10) |
| *B60K 6/48* | (2007.10) |
| *B60K 6/46* | (2007.10) |
| *H02K 7/02* | (2006.01) |
| *H02K 21/24* | (2006.01) |
| *B60K 6/24* | (2007.10) |
| *B60K 6/387* | (2007.10) |
| *F02B 75/18* | (2006.01) |

(Continued)

(52) U.S. Cl.
CPC ............... *B60K 6/46* (2013.01); *B60K 6/24* (2013.01); *B60K 6/26* (2013.01); *B60K 6/387* (2013.01); *B60K 6/485* (2013.01); *F02B 75/18* (2013.01); *F02N 11/04* (2013.01); *H02K 1/12* (2013.01); *H02K 1/27* (2013.01); *H02K 5/04* (2013.01); *H02K 7/006* (2013.01); *H02K 7/02* (2013.01); *H02K 21/24* (2013.01); *B60K 2006/268* (2013.01); *B60Y 2200/92* (2013.01); *F02B 75/06* (2013.01); *F02B 2075/1808* (2013.01);

(Continued)

(58) Field of Classification Search
CPC . B60K 6/485; B60K 6/24; B60K 6/26; B60K 2006/4825
USPC ................................................ 74/661, 665 E
See application file for complete search history.

(56) References Cited

U.S. PATENT DOCUMENTS

| | | | |
|---|---|---|---|
| 6,590,312 B1* | 7/2003 | Seguchi | B60K 6/26 310/266 |
| 6,695,082 B2* | 2/2004 | Bitsche | B60K 6/26 123/179.28 |

(Continued)

FOREIGN PATENT DOCUMENTS

| | | |
|---|---|---|
| CN | 1751909 A | 3/2006 |
| CN | 103085648 A | 5/2013 |

(Continued)

*Primary Examiner* — Ha Dinh Ho
(74) *Attorney, Agent, or Firm* — Morgan, Lewis & Bockius LLP (57) ABSTRACT

A power train apparatus may include an engine including a crankshaft and an engine block, a motor housing connected to the engine block and of which a housing opening is formed, a rotor portion connected to the crankshaft through the housing opening, of which a magnet is connected to a first side thereof and the rotor portion to which a balance portion is formed for compensating for imbalance rotational energy transmitted from the crankshaft; a stator portion disposed between the rotor portion and the motor housing and connected to the motor housing and a transmission connected to the engine block.

13 Claims, 11 Drawing Sheets

(51) Int. Cl.
  *F02N 11/04* (2006.01)
  *H02K 1/12* (2006.01)
  *H02K 1/27* (2006.01)
  *H02K 5/04* (2006.01)
  *H02K 7/00* (2006.01)
  *F02B 75/06* (2006.01)

(52) U.S. Cl.
  CPC ............ *Y02E 60/16* (2013.01); *Y10S 903/905* (2013.01); *Y10S 903/906* (2013.01); *Y10S 903/914* (2013.01)

(56) References Cited

U.S. PATENT DOCUMENTS

| | | | | |
|---|---|---|---|---|
| 8,227,931 | B2 * | 7/2012 | Aschaber | F02B 63/04 290/52 |
| 8,585,541 | B2 * | 11/2013 | Mueller | B60K 6/40 180/65.22 |
| 8,628,271 | B2 * | 1/2014 | Braun | B60K 6/40 404/110 |
| 8,884,491 | B2 * | 11/2014 | Kusase | H02K 7/14 310/266 |
| 2003/0102764 | A1 * | 6/2003 | Kusase | H02K 1/27 310/266 |

FOREIGN PATENT DOCUMENTS

| | | |
|---|---|---|
| CN | 104340046 A | 2/2015 |
| JP | H02-216323 A | 8/1990 |
| JP | 2012-080692 A | 4/2012 |
| KR | 10-1997-0036337 A | 7/1997 |
| KR | 10-2002-0053117 A | 7/2002 |
| KR | 20-0357587 Y1 | 7/2004 |
| KR | 10-2009-0024915 A | 3/2009 |
| KR | 10-2010-0063288 A | 6/2010 |
| WO | WO 2003/047068 A1 | 6/2003 |

* cited by examiner

POWER TRAIN

CROSS-REFERENCE TO RELATED APPLICATION

The present application claims priority to Korean Patent Application No. 10-2016-0138359 filed on Oct. 24, 2016, the entire contents of which is incorporated herein for all purposes by this reference.

BACKGROUND OF THE INVENTION

Field of the Invention

The present invention relates to a power train. More particularly, the present invention relates to a power train provided with a 2-cylinder engine and a motor.

Description of Related Art

Recently, research has been undertaken to enhance fuel efficiency of a vehicle, various researches, such as by designing of a two cylinder engine or a three cylinder engine have been undertaken.

However, enhancing of output and fuel efficiency of the two cylinder engine or the three cylinder engine may be limited according to various vehicle driving conditions.

Also, the two cylinder engine or the three cylinder engine outputs relatively serious vibration and applying an element, such as a balance shaft, for suppressing vibration to the two cylinder engine or the three cylinder engine may be limited.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power train provided with a 2-cylinder engine and a motor having advantages of reducing vibration and noise and enhancing fuel efficiency.

A power train according to an exemplary embodiment of the present invention may include an engine including a crankshaft and an engine block, a motor housing connected to the engine block and of which a housing hole is formed, a rotor portion connected to the crankshaft through the housing hole, of which a magnet is connected to a first side thereof and the rotor portion to which a balance portion is formed for compensating for imbalance rotational energy transmitted from the crankshaft; a stator portion disposed between the rotor portion and the motor housing and connected to the motor housing and a transmission connected to the engine block.

The rotor portion may include a protrude portion connected to the crankshaft through the housing hole and a disk connected to the protrude portion and to which the magnet is connected, wherein the balance portion may be formed at a first side of the disk as a concave shape.

The balance portion may be formed as a fan shape along a circumferential direction of the disk.

The balance portion may include a material of which density is lower than that of the disk.

The engine may be a two-cylinder engine and the balance portion may be formed at a position corresponding to a connecting rod journal of the crankshaft.

The stator portion may include a core plate of which the coil wraps along radial direction thereof and a stator plate on which a coil groove where the coil is inserted therein is formed.

The coil groove may include a wrapping portion in which the coil is inserted and an inlet portion of which width is narrower than that of the wrapping portion for the coil not to be separated.

The power train may further include a clutch selectively contactable with a second side of the rotor portion for transmitting rotation of the rotor portion to the transmission.

The power train may further include a balance shaft disposed under the crankshaft.

The balance shaft may include a weight to which a recess portion is formed for preventing from interfering with a connecting rod connected with the crankshaft.

A cross section of the weight may be shaped as an oval.

The balance shaft may include a first weight device and a second weight device corresponding to each cylinder, wherein an inside protrude portion adjacent to a center of the balance shaft and an outer protrude portion perimetrical to the inside protrude portion may be formed at the first and the second weight units.

A volume of the inside protrude portion may be larger than a volume of the outer protrude portion.

As described above, the power train provided with a 2-cylinder engine and a motor according to an exemplary embodiment of the present invention may reduce vibration and noise and enhance fuel efficiency and also a size of the engine may be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention A part irrelevant to the description will be omitted to clearly describe the present invention, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 1:
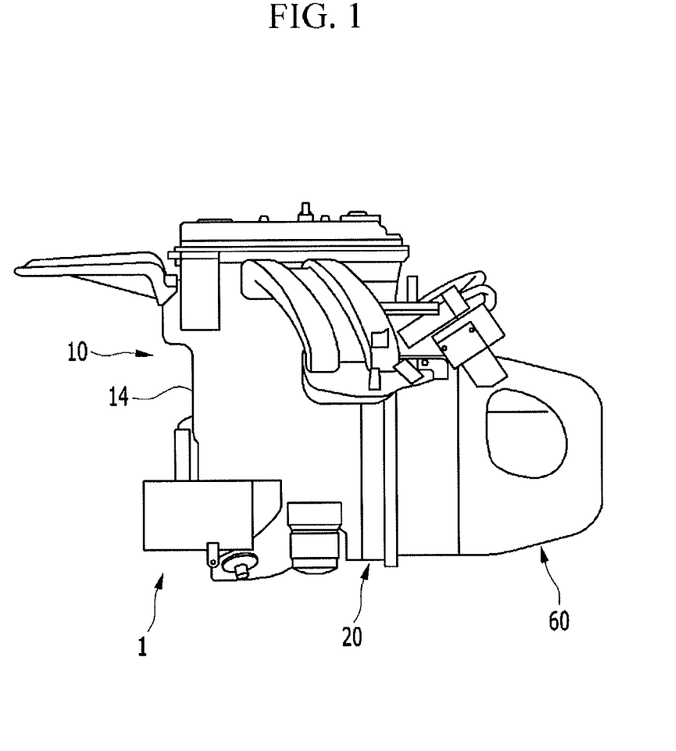
FIG. 1 is a front view of a power train according to an exemplary embodiment of the present invention.
Figure 2:
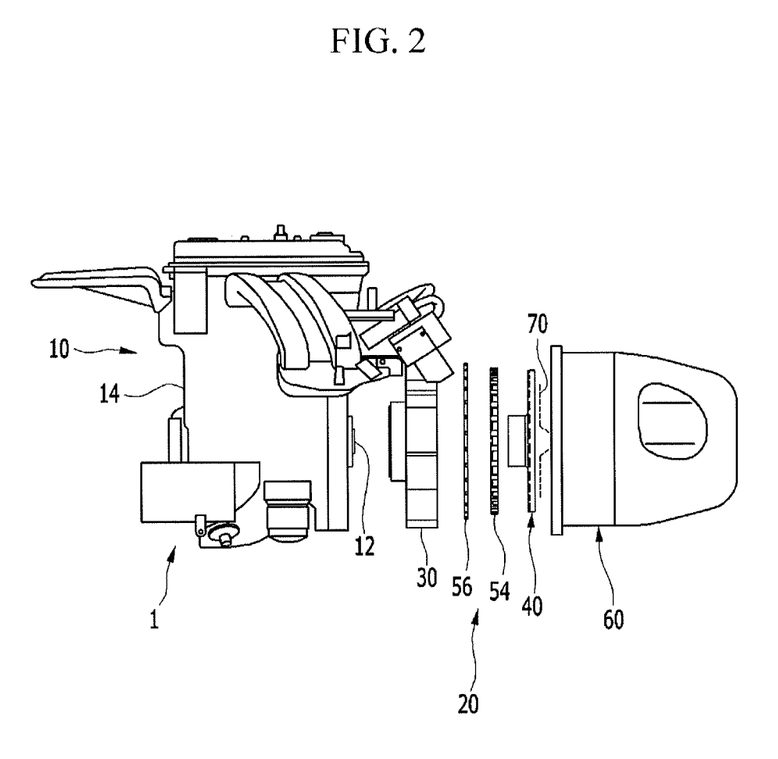
FIG. 2 is an exploded view of a power train according to an exemplary embodiment of the present invention.

FIG. 1 is a front view of a power train according to an exemplary embodiment of the present invention and FIG. 2 is an exploded view of a power train according to an exemplary embodiment of the present invention.

Figure 3:
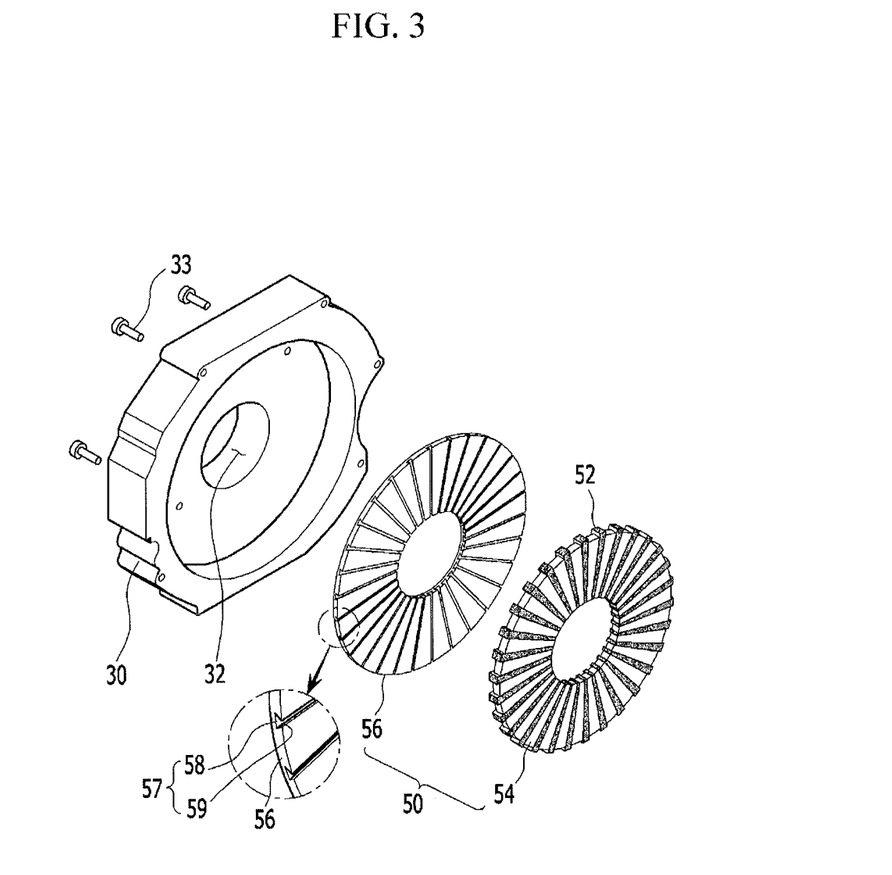
FIG. 3 is an exploded perspective view of a stator portion of a power train according to an exemplary embodiment of the present invention.
Figure 4:
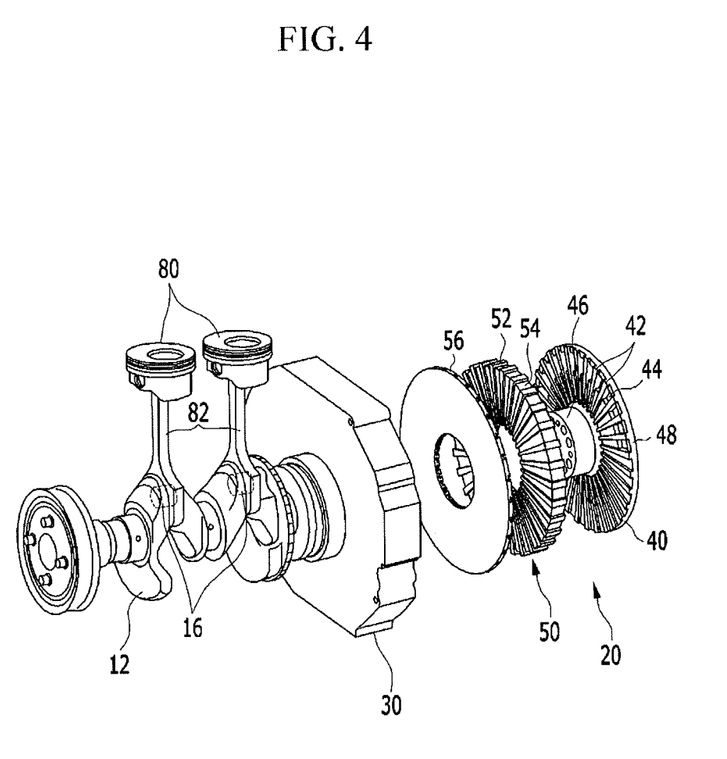
FIG. 4 is a partial exploded perspective view of a power train according to an exemplary embodiment of the present invention.

FIG. 3 is an exploded perspective view of a stator portion of a power train according to an exemplary embodiment of the present invention and FIG. 4 is a partial exploded perspective view of a power train according to an exemplary embodiment of the present invention.

Referring to FIG. 1 to FIG. 4, a power train 1 according to an exemplary embodiment of the present invention includes an engine 10 including a crankshaft 12 and an engine block 14, a motor housing 30 connected to the engine block 14 and of which a housing hole 32 is formed, a rotor portion 40 connected to the crankshaft 12 through the housing hole 32, of which a magnet 42 is connected to a first side thereof and the rotor portion 40 to which a balance portion 44 is formed for compensating for imbalance rotational energy transmitted from the crankshaft 12, a stator portion 50 disposed between the rotor portion 40 and the motor housing 30 and connected to the motor housing 30 and a transmission 60 connected to the engine block 14.

In an exemplary embodiment of the present invention, the power train 1 includes a motor/rotor portion 20 disposed between the engine 10 and the transmission 60 and functioning as a flywheel and a motor and thus the motor/rotor portion 20 may reduce vibration of the engine 10 and assists outputs of the engine 10.

In the instant case, the motor/rotor portion 20 includes the rotor portion 40 and the stator portion 50.

The rotor portion 40 is directly connected with the crankshaft 12 and stores rotational energy of the crankshaft 12 functioning as a flywheel such that the rotator portion 40 may reduce vibration of the engine 10.

The stator portion 50 and the rotor portion 40 functions as a motor for assisting output of the engine 10 and may be a main driving power source when the engine 10 is not operated. Also, the stator portion 50 and the rotor portion 40 outputs compensation torque corresponding to vibration of the engine 10 so that the stator portion 50 and the rotor portion 40 may function as a balance weight.

The stator portion 50 includes a core plate 54 of which the coil 52 wraps along radial direction thereof and a stator plate 56 on which a coil groove 57 where the coil 52 is inserted therein is formed. And the stator plate 56 is connected to the motor housing 30.

The motor housing 30 and the stator plate 56 may be assembled by a bolt such that assembly and disassembly may be easily performed.

Since the stator portion 50 is disposed between the rotor portion 40 and the motor housing 30, thus assembly may be easily performed and thus the motor/rotor portion 20 may be stable.

A receiving portion 34 for seating the stator portion 50 may be formed at the motor housing 30 and thus increase in length of the motor/rotor portion 20 may be suppressed.

The rotor portion 40 includes a protrude portion 46 connected to the crankshaft 12 through the housing hole 32 and a disk 48 connected to the protrude portion 46 and to which the magnet 42 is connected.

The magnet 42 and the coil 52 corresponded to the magnet 42 are disposed vertical to the crankshaft 12.

That is, the magnet 42 and the coil 52 is disposed along radial direction and thus increase in length of the motor/rotor portion 20 may be suppressed.

The coil groove 57 includes a wrapping portion 58 in which the coil 52 is inserted and an inlet portion 59 of which width is narrower than that of the wrapping portion 58 for the coil 52 not to be separated.

Since the coil 52 is inserted into the coil groove 57 thus the coil 52 may be stably fixed at a predetermined position without additional parts.

The power train 1 may further include a clutch 70 selectively contactable with a second side of the rotor portion 40 for transmitting rotation of the rotor portion 40 to the transmission 60 and the clutch 70 may be a friction clutch.

According to the connection state of the clutch 70, the motor/rotor portion 20 may function as a starter motor by supplied electric power from a battery 72, and also may function as a driving power source assisting the engine 10.

Figure 7:
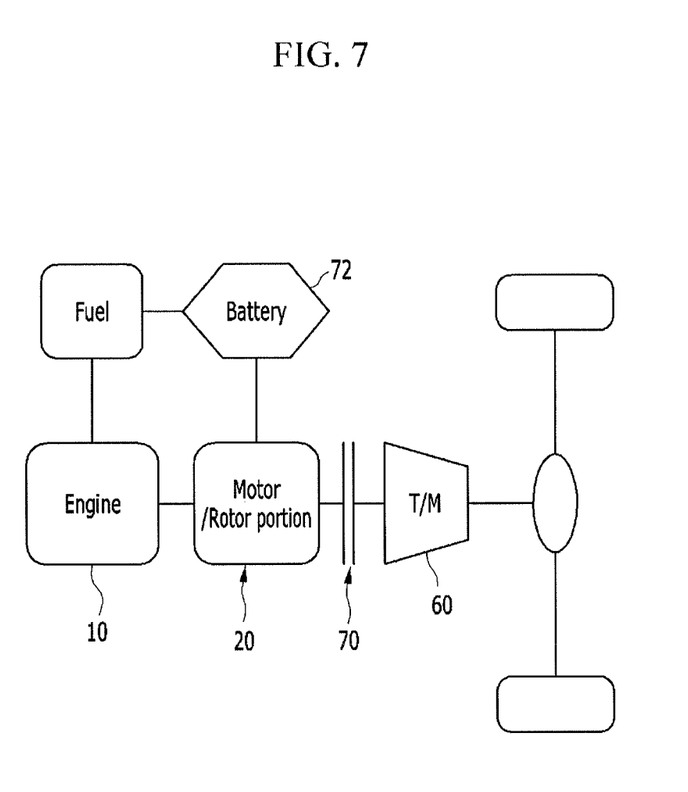
FIG. 7 is a schematic diagram of a power train according to an exemplary embodiment of the present invention.

FIG. 7 is a schematic diagram of a power train according to an exemplary embodiment of the present invention.

Referring to FIG. 7, in the exemplary embodiment of the present invention, the engine 10 is directly connected with the motor/rotor portion 20 and the clutch 70 is disposed between the transmission 60 and the rotor portion 40 for selectively connecting the transmission 60 with the rotor portion 40.

According to the connection state of the clutch 70, the motor/rotor portion 20 may function as a starter motor by supplied electric power from a battery 72, and also may function as a driving power source assisting the engine 10.

Also, the motor/rotor portion 20 may function as a generator when assisting power is not required and the generated electric power is stored in the battery 72.

Figure 5:
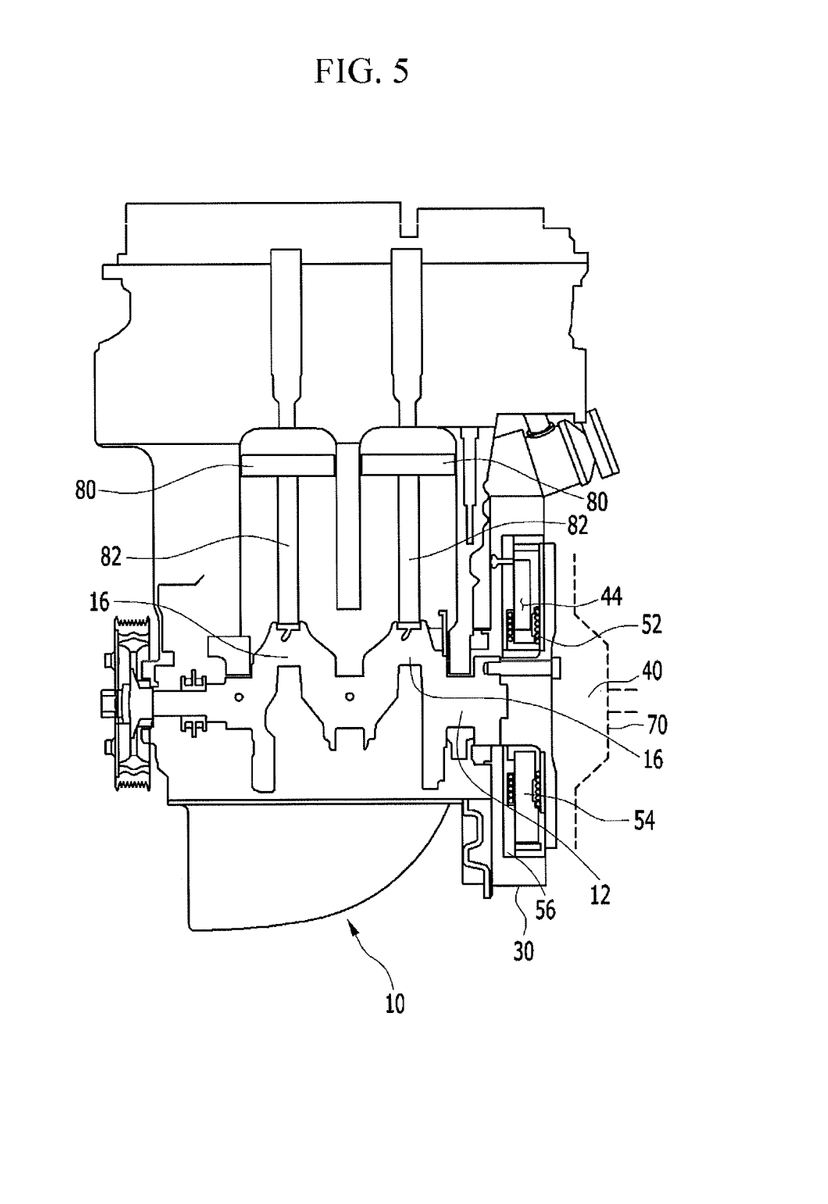
FIG. 5 is a cross sectional view of an engine of a power train according to an exemplary embodiment of the present invention.
Figure 6:
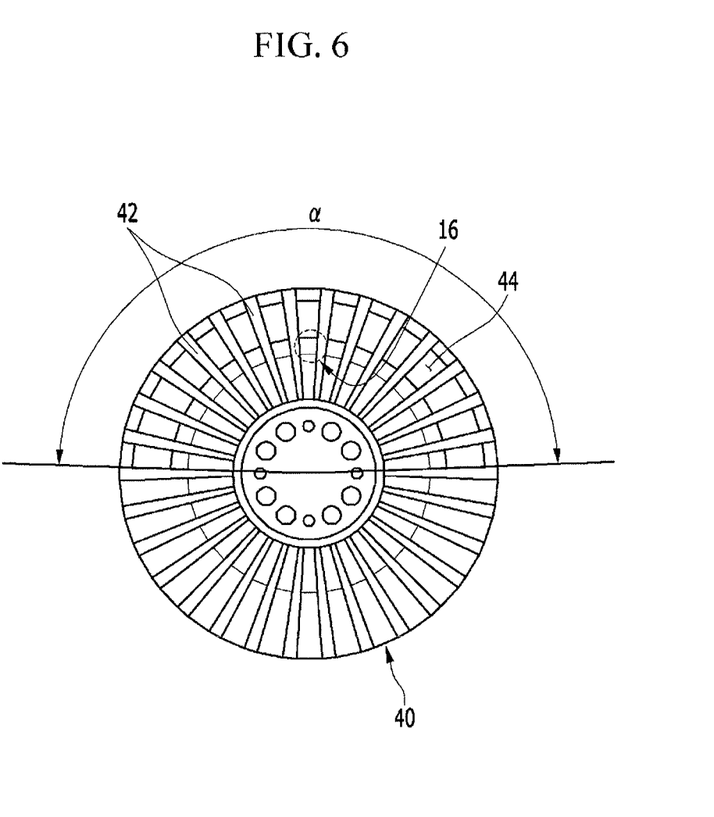
FIG. 6 is a front view of a rotor portion of a power train according to an exemplary embodiment of the present invention.

FIG. 5 is a cross sectional view of an engine of a power train according to an exemplary embodiment of the present invention and FIG. 6 is a front view of a rotor portion of a power train according to an exemplary embodiment of the present invention.

FIG. 5 and referring to FIG. 6, the balance portion 44 is formed at a first side of the disk 48 of the rotor portion 40 as a concave shape.

That is, the balance portion 44 may be a space function as a balance weight having negative value. Thus, total weight of the rotor portion 40 may be reduced such that the rotor portion 40 may be highly efficient in high speed.

The balance portion 44 is formed as a fan shape along a circumferential direction of the rotor portion 40.

Thus, cross section along a diameter direction of the rotor portion 40 may be simplified and be highly efficient in productivity.

In a modified exemplary embodiment, the balance portion 44 may include a material of which density is lower than that of the disk 48 of the rotor portion 40. Thus rigidity of the rotor portion 40 may be maintained.

The balance portion 44 is formed at a position corresponding to a connecting rod journal 16 of the crankshaft 12.

A connecting rod 82 is connected with the connecting rod journal 16 and the connecting rod 82 is connected with a piston 80. And the balance portion 44 is formed at the position corresponding to the connecting rod journal 16 of the crankshaft 12 for compensating for the imbalance rotational energy transmitted from the crankshaft 12.

As shown in drawings, the engine 10 may be two-cylinder engine including two positions 80 reciprocating with the same phase angles each other.

A shape of the balance portion 44, that is "α" shown in FIG. 6 may be determined according to imbalance force due to reciprocal motion of the piston 80.

Figure 8:
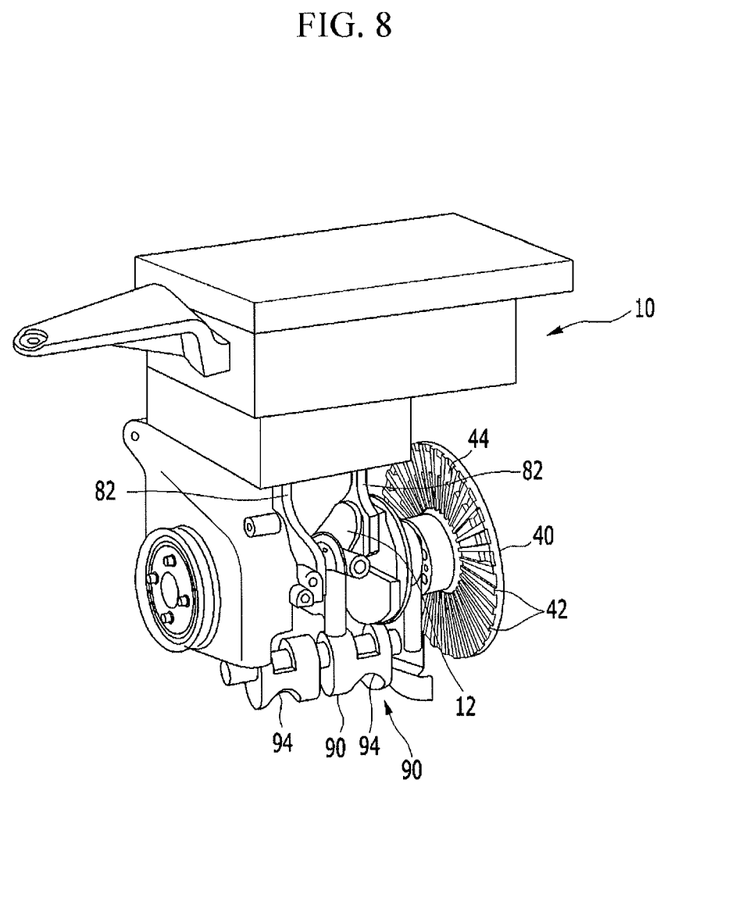
FIG. 8 is a partial perspective view of a power train according to an exemplary embodiment of the present invention.
Figure 9:
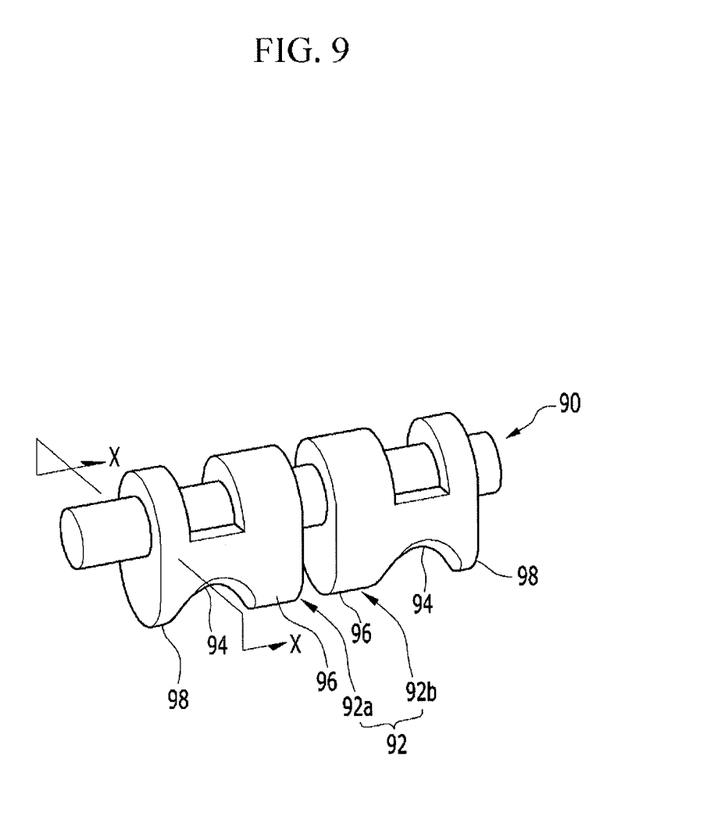
FIG. 9 is a perspective view of a balance shaft applied to a power train according to an exemplary embodiment of the present invention.
Figure 10:
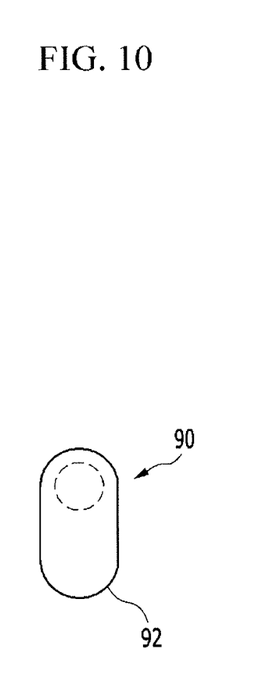
FIG. 10 is a cross-sectional view along line X-X of FIG. 9.

FIG. 8 is a partial perspective view of a power train according to an exemplary embodiment of the present invention, FIG. 9 is a perspective view of a balance shaft applied to a power train according to an exemplary embodiment of the present invention and FIG. 10 is a cross-sectional view along line X-X of FIG. 9.

For easy comprehension, the same or similar elements of the power train described in FIG. 1 to FIG. 7 will be designated by the same reference numerals and repeated description will be omitted.

The power train 1 may further include a balance shaft 90 disposed under the crankshaft 12.

The balance shaft 90 includes a weight 92 to which a recess portion 94 is formed for preventing from interfering with the connecting rod 82 connected with the crankshaft 12.

A cross section of the weight 92 may be shaped as an oval and thus manufacturing may be simplified with the simple scheme.

The balance shaft 90 includes a first weight device 92a and a second weight device 92b corresponding to each cylinder, and an inside protrude portion 96 adjacent to a center of the balance shaft 90 and an outer protrude portion 98 perimetrical to the inside protrude portion 96 is formed at the first weight device 92a and the second weight device 92b.

A volume of the inside protrude portion 96 is larger than a volume of the outer protrude portion 98. Since the inside protrude portion 96 is larger than the outer protrude portion 98 in volume, and thus rotational inertia of the balance shaft 90 is adjacent to a center of the engine 10. So, it is highly efficient to reduce vertical direction vibration and horizontal direction vibration of the engine 10.

Figure 11:
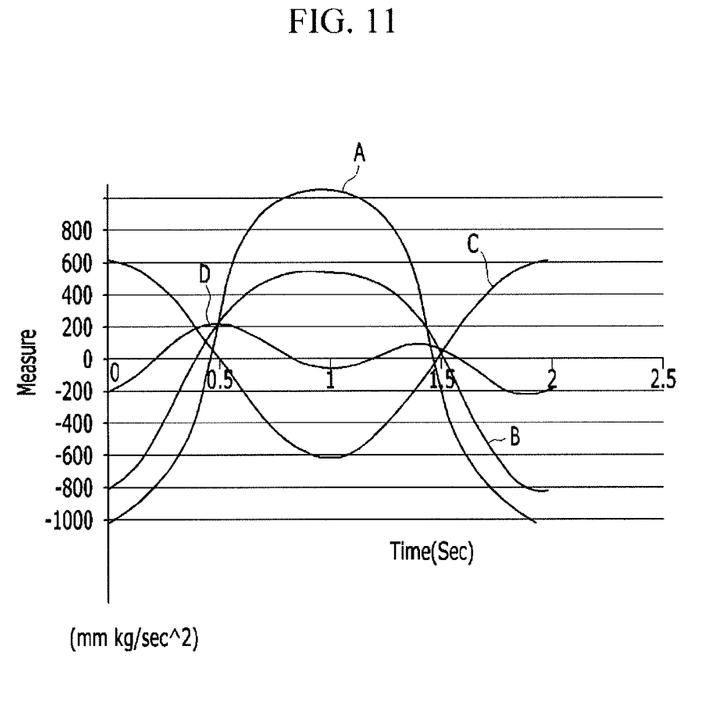
FIG. 11 is a graph showing power applied to a crankshaft induced by rotation of a power train according to an exemplary embodiment of the present invention.

FIG. 11 is a graph showing power applied to a crankshaft induced by rotation of a power train according to an exemplary embodiment of the present invention.

In the drawing, "A" denotes imbalance power applied to the crankshaft 12 without the balance portion 44 and "B" denotes imbalance power applied to the crankshaft 12 with the balance portion 44.

And "C" denotes imbalance power induced by the balance shaft 90 and "D" denotes imbalance power determined by adding the "B" and the "C".

As shown in FIG. 11, the imbalance power applied to the crankshaft 12 of the rotor portion 40 with the balance portion 90 may be reduced approximately 50% comparing to the rotor portion 40 without the balance portion 90.

Also, the imbalance power applied to the crankshaft 12 may be reduced by combining the rotor portion 40 with the balance portion 90 and the balance shaft 90 to approximately ⅓.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power train apparatus comprising:
    an engine including a crankshaft and an engine block;
    a motor housing connected to the engine block and of which a housing opening is formed;
    a rotor portion connected to the crankshaft through the housing opening, of which a magnet is connected to a first side thereof and the rotor portion to which a balance portion is formed for compensating for imbalance rotational energy transmitted from the crankshaft;

a stator portion disposed between the rotor portion and the motor housing and connected to the motor housing; and a transmission connected to the engine block.

2. The power train apparatus of claim 1, wherein the rotor portion includes:

a protrude portion connected to the crankshaft through the housing opening; and a disk connected to the protrude portion and to which the magnet is connected, wherein the balance portion is formed at a first side of the disk as a concave shape.

3. The power train apparatus of claim 1, the balance portion is formed as a fan shape along a circumferential direction of the disk.

4. The power train apparatus of claim 2, wherein the balance portion includes a material of which density is lower than that of the disk.

5. The power train apparatus of claim 1, wherein the engine is a two-cylinder engine; and wherein the balance portion is formed at a position corresponding to a connecting rod journal of the crankshaft.

6. The power train apparatus of claim 1, wherein the stator portion includes:

a core plate of which a coil wraps along a radial direction thereof; and a stator plate on which a coil groove where the coil is inserted therein is formed.

7. The power train apparatus of claim 6, wherein the coil groove includes:

a wrapping portion in which the coil is inserted; and an inlet portion of which width is narrower than that of the wrapping portion.

8. The power train apparatus of claim 1, further including a clutch selectively contactable with a second side of the rotor portion for transmitting rotation of the rotor portion to the transmission.

9. The power train apparatus of claim 1, further including a balance shaft disposed under the crankshaft.

10. The power train apparatus of claim 9, wherein the balance shaft includes a weight to which a recess portion is formed for preventing from interfering with a connecting rod connected with the crankshaft.

11. The power train apparatus of claim 10, wherein a cross section of the weight is shaped as an oval.

12. The power train apparatus of claim 9, wherein the balance shaft includes a first weight device and a second weight device corresponding to each cylinder, and wherein an inside protrude portion adjacent to a center of the balance shaft and an outer protrude portion perimetrical to the inside protrude portion are formed at the first weight device and the second weight device.

13. The power train apparatus of claim 12, wherein a volume of the inside protrude portion is larger than a volume of the outer protrude portion.

* * * * *